(No Model.)

C. HEINRICH.
LUBRICATOR.

No. 541,355. Patented June 18, 1895.

Witnesses:
Geo. W. Young.
Chas. L. Goss.

Inventor:
Christopher Heinrich,
By Winkler, Flanders, Smith, Bottum & Vilas
Attorneys.

UNITED STATES PATENT OFFICE.

CHRISTOPHER HEINRICH, OF MILWAUKEE, WISCONSIN.

LUBRICATOR.

SPECIFICATION forming part of Letters Patent No. 541,355, dated June 18, 1895.

Application filed September 1, 1894. Serial No. 521,907. (No model.)

*To all whom it may concern:*

Be it known that I, CHRISTOPHER HEINRICH, of Milwaukee, in the county of Milwaukee and State of Wisconsin, have invented certain new and useful Improvements in Centrifugal Lubricators; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to utilize centrifugal force to feed a lubricant automatically and continuously to a loose pulley or other piece of mechanism which revolves on a fixed bearing, and to regulate the feed according to the speed of the pulley or other rotating device.

It consists essentially of a closed cup or receptacle having a piston or follower, and a feed passage leading from the cup above or outside of said piston to the bearing to be lubricated, and means of opposing more or less resistance to the movement of the piston or follower, as hereinafter particularly described and pointed out in the claims.

In the accompanying drawings like letters designate the same parts in both figures.

Figure 1:
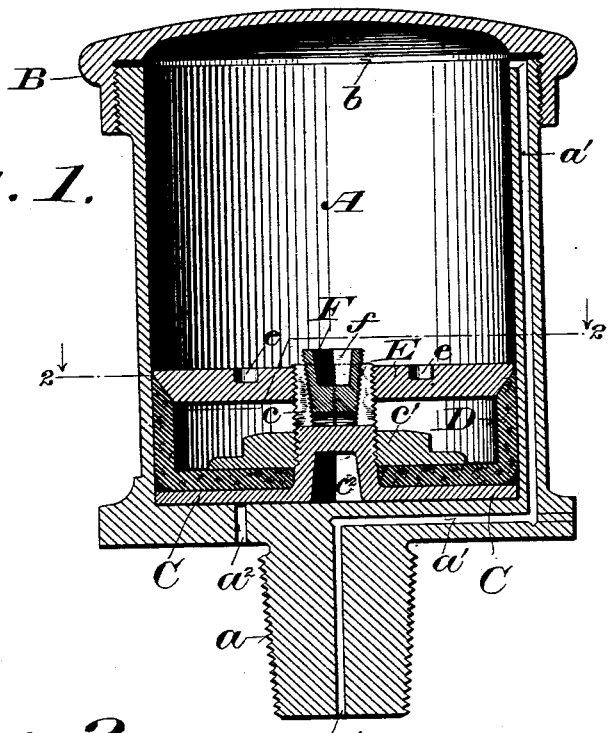
Figure 2:
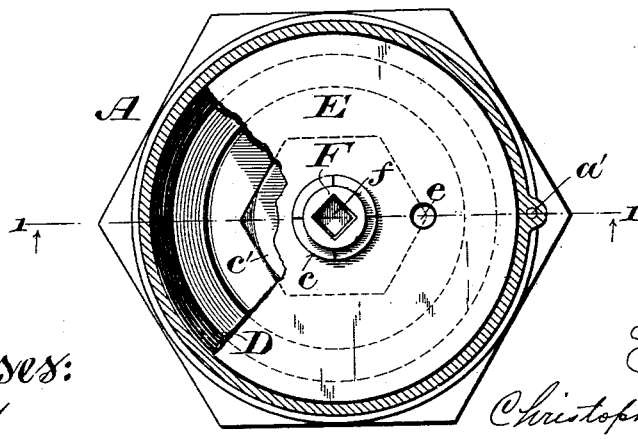

Figure 1 is a vertical medial section on the line 1 1, Fig. 2, of a lubricator embodying my invention; and Fig. 2 is a horizontal section thereof on the line 2 2, Fig. 1.

A designates a cylindrical cup or receptacle formed at the bottom with an externally screw-threaded neck $a$ by which it is attached to the hub of a loose pulley or to any other rotary part which turns on a fixed bearing. It is provided at the top or outer end, which is made open, with a screw cap B, and packing ring $b$ by which it is closed and leakage is prevented, and has a feed passage $a'$ leading out of the upper or outer portion of the cup through one side, the base and neck $a$ thereof, to the bearing to be lubricated. It has also a vent passage $a^2$ through the bottom to admit air behind the piston or follower.

C is a centrifugal piston or follower formed on the upper or outer side with a central hollow stem $c$ which is both externally and internally threaded. It is provided with a cupped packing D of leather or other suitable flexible material which is clamped between it and a nut $c'$ threaded on the neck $c$. It is also provided with a spreader E consisting of a metal disk threaded on said stem $c$ and formed with a beveled periphery adapted to engage the correspondingly beveled edge of the cupped packing D, and when screwed down upon said stem $c$, to press said packing outwardly against the walls of cup A, thereby increasing the resistance to the movement of the piston in said cup.

The packing D and spreader E constitute an adjustable frictional bearing between the piston and cup for controlling the centrifugal movement of the piston and regulating the feed of oil.

F is a tapered externally screw-threaded plug inserted in the upper or outer end of stem $c$, which is split lengthwise as shown, so as to permit its expansion by the taper plug F in the threaded hole in disk E, and thereby securely lock said disk in place when it is set as desired on said stem. The stem $c$ is formed at its lower end in the under side of the piston with a squared socket $c^2$, and the larger end of plug F is formed with a similar socket $f$ to receive correspondingly shaped tools for the purpose of adjusting the spreader E upon said stem $c$, and locking it when adjusted by means of the plug F. The spreader disk E is formed in the upper or outer side with sockets $e$ $e$, to receive a spanner wrench or other tool for turning it on said stem $c$. By means of these devices any desired resistance or obstruction to the movement of the piston or follower in the cup or receptacle, may be secured so as to cause the oil to be fed at the desired rate through passage $a'$ to the bearing by the centrifugal action of the piston or follower for any given rate of rotation. It will be observed that the cap is concaved or recessed on the inside so as to extend beyond or outside of the opening from the cup into the feed passage $a'$. By this means impurities carried by centrifugal force outwardly against the cap, are held therein and prevented from entering and clogging said passage.

By providing an adjustable resistance to the movement of the centrifugal piston or follower B, I am enabled to regulate the supply of oil to the bearing without the use of a valve in the feed passage.

I do not wish to be understood as limiting myself to the exact details of construction shown and described for the purpose of explaining my invention, since any means of readily varying the resistance to the centrifugal action of the piston or follower in a cup or lubricator generally resembling that shown, will accomplish the desired result.

I claim—

1. In a centrifugal lubricator, the combination of an oil cup or receptacle, having a feed passage leading from the upper or outer part thereof through the base, a piston or follower adapted to be moved outwardly therein against the contents of the cup by centrifugal force and an adjustable frictional bearing between the piston and cup whereby the movement of the piston and the feed of oil are regulated as desired, substantially as and for the purposes set forth.

2. In a centrifugal lubricator, the combination of an oil cup or receptacle having a feed passage leading from the upper or outer part thereof to the bearing to be lubricated, and a vent opening or passage in the bottom, and a piston or follower adapted to be moved outwardly therein against the contents of the cup by centrifugal force, and provided with an expansible bearing and means wholly within the cup of spreading said bearing more or less whereby adjustable resistance to the movement of the follower is afforded, substantially as and for the purposes set forth.

3. In a centrifugal lubricator, the combination of an oil cup or receptacle having a feed passage leading from the upper or outer part thereof through the base, and a piston or follower adapted to be moved outwardly against the contents of the cup by centrifugal force and provided with an expansible packing, a spreader for expanding the packing and means of securing the spreader in place, whereby the rate of feed may be regulated as desired substantially as and for the purposes set forth.

4. In a centrifugal lubricator, the combination of an oil cup or receptacle having a feed passage leading from the upper or outer part thereof, and a vent opening or passsage through the bottom, a piston or follower provided with an internally and externally threaded split stem, and with cup-shaped flexible packing having a beveled edge, a spreading disk threaded upon said stem and having a beveled periphery, and a tapered plug threaded in said stem, substantially as and for the purposes set forth.

In testimony that I claim the foregoing as my own I affix my signature in presence of two witnesses.

CHRISTOPHER HEINRICH.

Witnesses:
C. J. KAISER,
CHAS. L. GOSS.